(12) United States Patent
Cardemon

(10) Patent No.: US 8,360,784 B2
(45) Date of Patent: Jan. 29, 2013

(54) REWARD CHAIN

(76) Inventor: Carole Cardemon, Muncie, IN (US)

( * ) Notice: Subject to any disclaimer, the term of this patent is extended or adjusted under 35 U.S.C. 154(b) by 372 days.

(21) Appl. No.: 12/857,150

(22) Filed: Aug. 16, 2010

(65) Prior Publication Data

US 2011/0039240 A1 Feb. 17, 2011

Related U.S. Application Data

(60) Provisional application No. 61/234,067, filed on Aug. 14, 2009.

(51) Int. Cl.
*G09B 19/00* (2006.01)

(52) U.S. Cl. ........................................ 434/236

(58) Field of Classification Search .............. 434/236, 434/237, 238, 81, 96, 97, 433; D19/1, 5; 40/633; 283/61, 62, 117
See application file for complete search history.

(56) References Cited

U.S. PATENT DOCUMENTS

| | | | |
|---|---|---|---|
| 2,340,139 A | | 1/1944 | Norford |
| 2,414,614 A * | | 1/1947 | Shurick, Sr. ............... 434/238 |
| 2,883,765 A | | 4/1959 | Blaine |
| 2,965,978 A | | 12/1960 | Olson |
| 3,035,355 A * | | 5/1962 | Holmes ..................... 434/238 |
| 3,782,009 A * | | 1/1974 | Darnell ..................... 434/238 |
| 4,216,598 A | | 8/1980 | Newbert |
| 4,422,852 A | | 12/1983 | Mathias |
| 4,741,701 A | | 5/1988 | Kossor |
| 4,776,799 A | | 10/1988 | Walsh |
| D316,877 S | | 5/1991 | Mitchell |
| D329,468 S | | 9/1992 | Hatt |
| 5,190,459 A | | 3/1993 | Determan |
| D346,406 S | | 4/1994 | Pennington |
| 5,573,404 A * | | 11/1996 | Stawski, II ................ 434/238 |
| 5,573,405 A | | 11/1996 | Evans |
| 5,577,915 A | | 11/1996 | Feldman |
| 5,639,242 A | | 6/1997 | Wilson |
| 5,697,790 A * | | 12/1997 | Garland et al. ............ 434/236 |
| 5,725,381 A | | 3/1998 | Kollath et al. |
| D413,356 S | | 8/1999 | Ingram |
| 5,954,512 A * | | 9/1999 | Fruge ......................... 434/238 |
| 6,203,327 B1 * | | 3/2001 | Ottrando .................... 434/262 |
| 6,345,821 B1 * | | 2/2002 | Labrot ........................ 273/236 |
| 6,349,493 B1 * | | 2/2002 | Newman et al. ............. 40/633 |
| 6,461,012 B1 | | 10/2002 | Shuman |
| 6,572,380 B1 | | 6/2003 | Buckley et al. |
| 7,153,138 B2 | | 12/2006 | Charles |
| 7,347,693 B2 * | | 3/2008 | Low et al. ................... 434/236 |
| 7,491,063 B1 * | | 2/2009 | Santarsiero ................. 434/236 |
| D663,353 S * | | 7/2012 | Waltersdorf .................. D19/1 |
| 2008/0280278 A1 | | 11/2008 | Chu et al. |

OTHER PUBLICATIONS

"Carolina Parent: Links of Hope Paper Chain Project to Benefit Ella's Miracle", Oct. 2, 2008 [retrieved online Oct. 1, 2012].*
"Education World: Behavior Management Tips: Improving Class Behavior", 2005 [retrieved online Oct. 1, 2012].*
"Community News: Good Behavior Chain At WBE", Mar. 31, 2008 [retrieved online Oct. 1, 2012].*

\* cited by examiner

*Primary Examiner* — Kurt Fernstrom
(74) *Attorney, Agent, or Firm* — John V. Daniluck; Bingham Greenebaum Doll LLP

(57) ABSTRACT

Methods and apparatus for a game in which children are rewarded for their good behavior. In one embodiment, the game includes a plurality of strips that include written messages of positive reinforcement. When the child acts in a manner that is praiseworthy, the parent instructs the child to remove a strip with a printed message, instructs the child as to the meaning of the message and the spelling of the message, and instructs the child to form the strip into a ring that is placed on a chain of other such strips. When the chain reaches a predetermined position (such as in contact with the floor or a predetermined number of links in the chain) the child receives a reward.

15 Claims, 6 Drawing Sheets

REWARD CHAIN

CROSS REFERENCE TO RELATED APPLICATION

This application claims the benefit of priority to U.S. Provisional Patent Application Ser. No. 61/234,067, filed Aug. 14, 2009, incorporated herein by reference.

FIELD OF THE INVENTION

Some embodiments of the present invention pertain to games for educating children, and in particular to methods and apparatus for rewarding good behavior of young children.

SUMMARY OF THE INVENTION

One aspect of the present invention pertains to an apparatus for teaching a child. Some embodiments include a backing including a plurality of readily separable strips, each strip having printed thereon a message of positive reinforcement to the child printed on one side of the strip. Other embodiments include an adhering layer across one end of each strip wherein each said strip is separable from said sheet and the separated strip can be formed into a ring.

Another aspect of the present invention pertains to a method for teaching a child providing a sheet that includes a plurality of elongated strips, each strip having on one side a message of positive reinforcement to the child. Some embodiments include instructing the child to separate a strip from the sheet after the child performs a praiseworthy task, adhering one end of the separated strip to the other end of the same strip, forming a chain of adhered strips, and giving the child a reward when the chain reaches a predetermined length.

These and other aspects will be discussed in the text, drawings, and claims that follow.

BRIEF DESCRIPTION OF THE DRAWINGS

FIG. 3(*b*) is a front planar view of a sheet of strips according to another embodiment of the present invention.

DESCRIPTION OF THE PREFERRED EMBODIMENT

Figure 1:
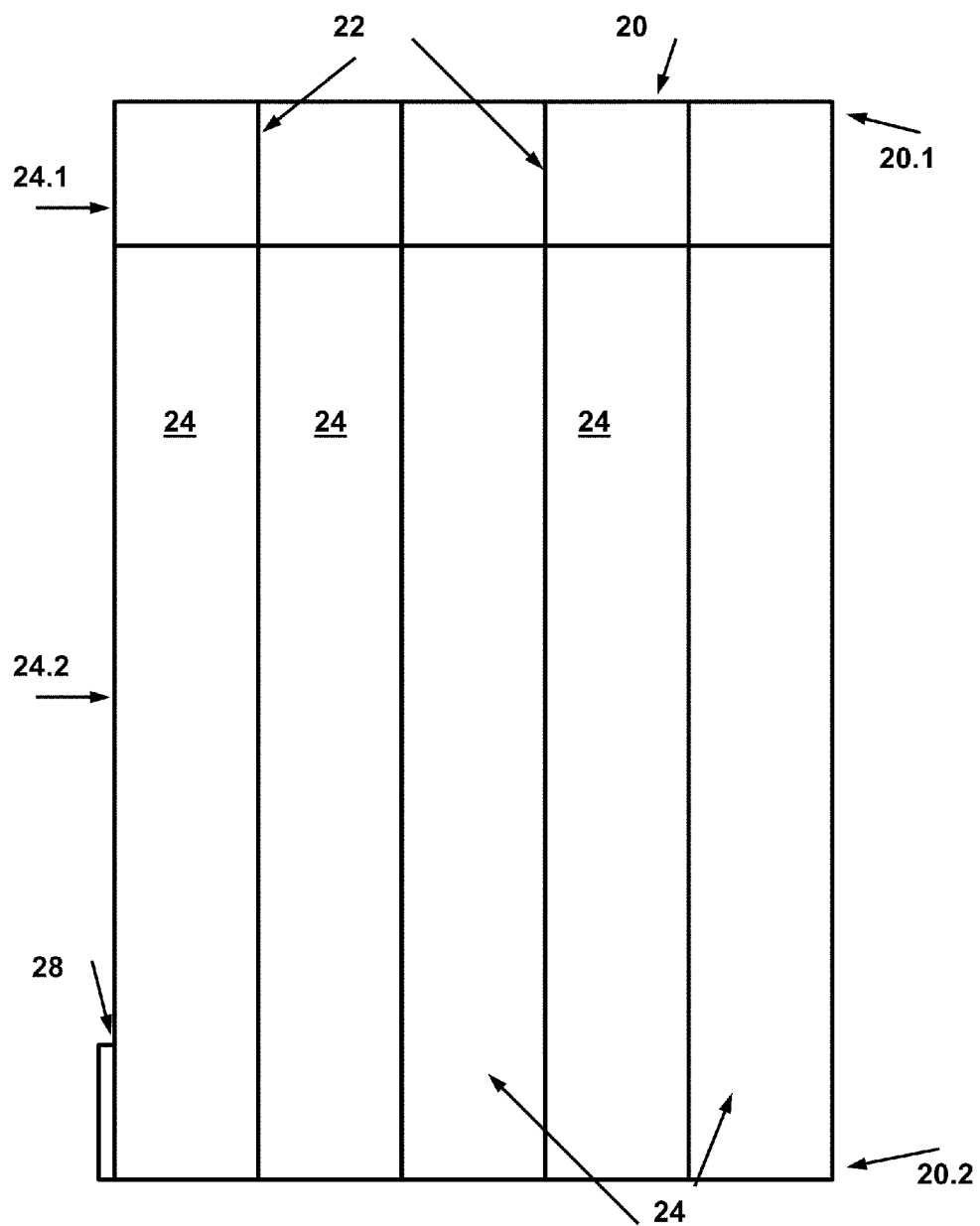
FIG. 1 is a front planar view of a sheet of strips according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that must be included in all embodiments, unless otherwise stated.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only. Further, with discussion pertaining to a specific composition of matter, that description is by example only, does not limit the applicability of other species of that composition, nor does it limit the applicability of other compositions unrelated to the cited composition.

Various embodiments of the present invention pertain to an interactive and educational game of reward for a child's positive behavior. After the child performs a task in a manner worthy of compliment from the parent, the child is permitted to construct another ring in her or his own reward chain. The child constructs the various rings of the chain by herself or himself and at the request of the parent. This intermediate action of creating the chain helps reinforce to the child that a reward is coming to her or him in the future. The child is told that when a sufficient number of rings have been made into the chain, that a reward will be provided to her or him. Therefore, the creation of the chain helps educate the child that the steady performance of praiseworthy tasks includes both a near-term, smaller reward (which is the act of creating the ring and lengthening the chain), as well as leading to a longer-term and more substantial reinforcement (which is the reward for having obtained a chain of sufficient link).

Various embodiments of the present invention pertain to a reward chain that is a method for parenting in a positive manner. This method builds upon the principle that children respond to positive reinforcement much better than they do to negative interaction. In one embodiment, each child is given a strip, or link, or ring for every helpful thing that they do for themselves or others. They can then hang the ring on a door frame to be made into a reward chain. As soon as the chain reaches the floor they can receive a predetermined prize. As one example, the children can choose to go to a local arcade.

Various embodiments of the present invention incorporate a close functional relationship between the matter that is printed on the strip or link and the psychological reasons for the child being able to use that same strip or link in a game with their parents. For example, in one embodiment, each strip includes a geometric design at one end. The parent instructs the child that this geometric design is functionally related to the manner in which the ring is to be created by the child. In one embodiment, the simple symbol is placed at the end of the strip which is the joining interface of the two ends of the strip into a ring. This can be useful in those cases where the child is too young to read, but is old enough to allow the parent to create a functional relationship between the printed indicia (the simple shape) and the act of creating a reward ring. Examples of such symbols include simple geometric shapes, letters, and in some cases, colors.

Various embodiments of the present invention include yet another functional relationship between the printed matter and the creation of a reward chain. In some embodiments, the strips of material include a written message of positive reinforcement. Preferably, the written messages are universally accepted for being positive in nature, i.e., not cynical in nature. Examples of such messages include words such as terrific, fantastic, wonderful, etc. In these embodiments the child is taught to associate that: (a) their positive act, (b) can be expressed in a word printed on the strip, (c) having performed the positive act, the child can form the strip into a ring to be placed upon a chain. In those situations in which the child is too young to read, or is old enough to read, but is not aware of the specific word, the printed matter (such as the word "magnificent") creates an opportunity in which the positive reinforcement for the good act that was done is combined with a learning exercise in spelling.

In various embodiments, the strips and the subsequent creation of rings on a chain are functionally related by the parent to the child in a simultaneous reward experience and learning experience. Yet other examples of the learning experience include the use of punctuation, such as an exclamation mark, which serves the dual functional purposes of emphasizing the pleasant surprise for the child's good behavior, and also teaching the child how to express such surprise in written form. As yet another example, each of the strips are printed in different fonts. As one example, the "T" in "outstanding" is in one font, and the "T" in "terrific" is in another font. Therefore, as these two strips are used to reward good behavior and the continued creation of the reward chain, the child is further taught of the basic elements of the letter "T," and how those elements can be expressed in different styles yet still convey the same letter.

As further examples, the children receive links on their chain for positive behavior such as going to bed on time or getting homework done. With very young children, rings can be given for learning proper bathroom behavior. Rings can also be given for a variety of behavior worthy of positive recognition, including good grades, listening, bravery, cooperation, exercise, respecting meal time, and doing chores.

FIG. 1 is a front planar view of a sheet 20 according to one embodiment of the present invention. Sheet 20 includes a plurality of strips 24 that are readily peelable or separable. In some embodiments, sheet 24 includes a glossy, low-stick layer, and each strip 24 includes a complimentary low-stick layer on its back side. Therefore, each strip can be easily pulled off of the backing sheet 20 without incurring damage to the strip. In yet other embodiments, strips 24 are each separated by a perforation 22. Strips 24 extend lengthwise from the top 20.1 to the bottom 20.2 of sheet 20.

Sheet 20 is preferably fabricated from semi-rigid paper such as cardboard. Preferably, sheet 20 is a single ply of paper. Although the use of paper for sheet 20 has been shown and described, it is further understood that in other embodiments of the present invention, plate is sheet 20 fabricated from any thin, flexible membrane that can be perforated or pre-cut into strip shapes, including semi-rigid plastic material. As discussed previously, the face of sheet 20 can include a layer of a material that permits the easily peelable removal of a strip from sheet 20.

Figure 2:
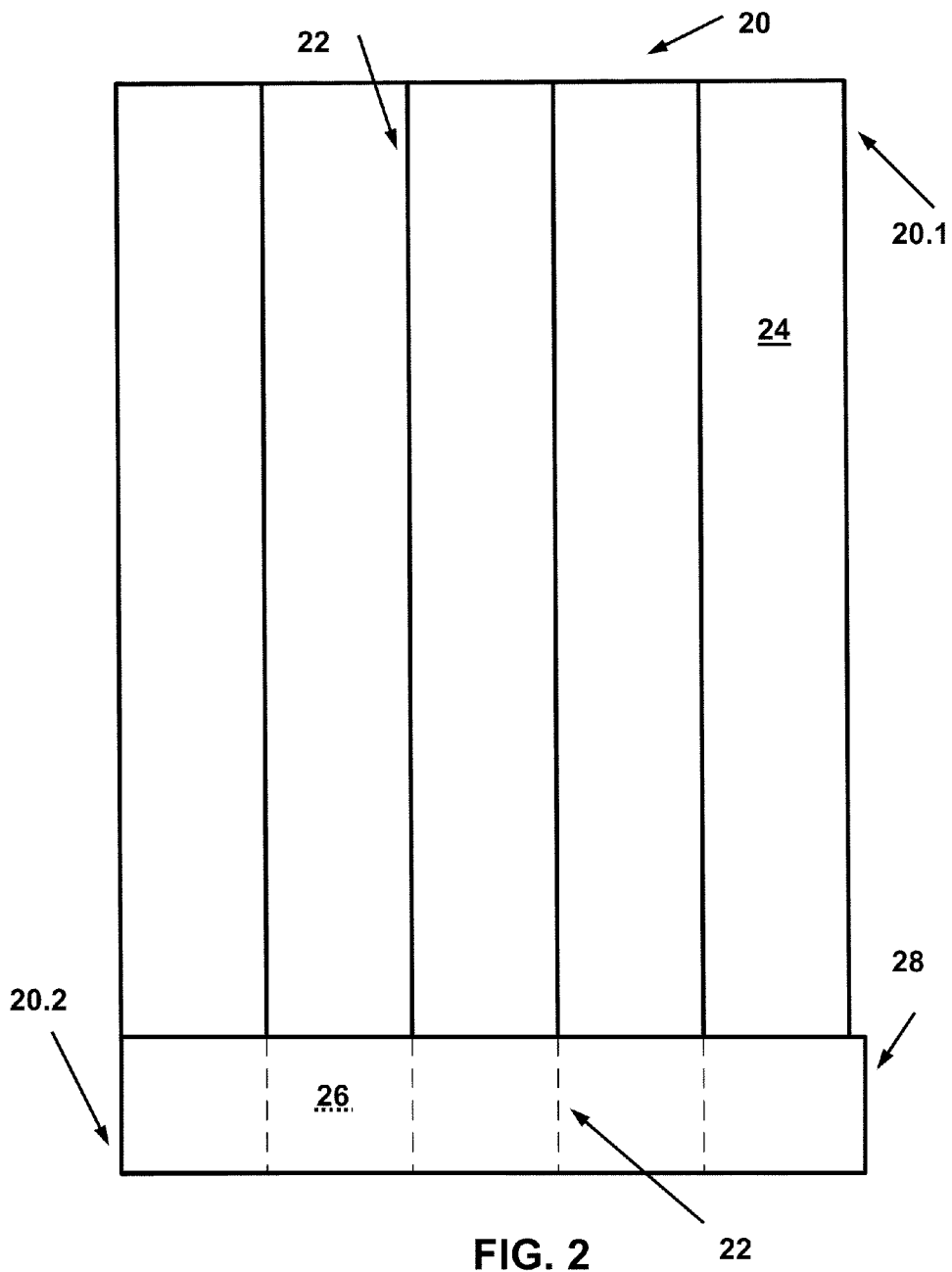
FIG. 2 is a rear planar view of the sheet of FIG. 1.

FIG. 2 is a planar view of the reverse side of the sheet of FIG. 1. Sheet 20 includes a layer of an adhesive material 26 that extends across the bottom side of each of strips 24. An easily removable liner 28 extends over the adhesive layer 26 so as to prevent premature bonding of the underneath surface of sheet 20. In those embodiments in which the individual strips are peelably removable from sheet 20, the liners may be individual to each strip, such that after the strip is peeled away from sheet 20, the individual liner 28 can be removed from that particular strip.

Figure 3A:
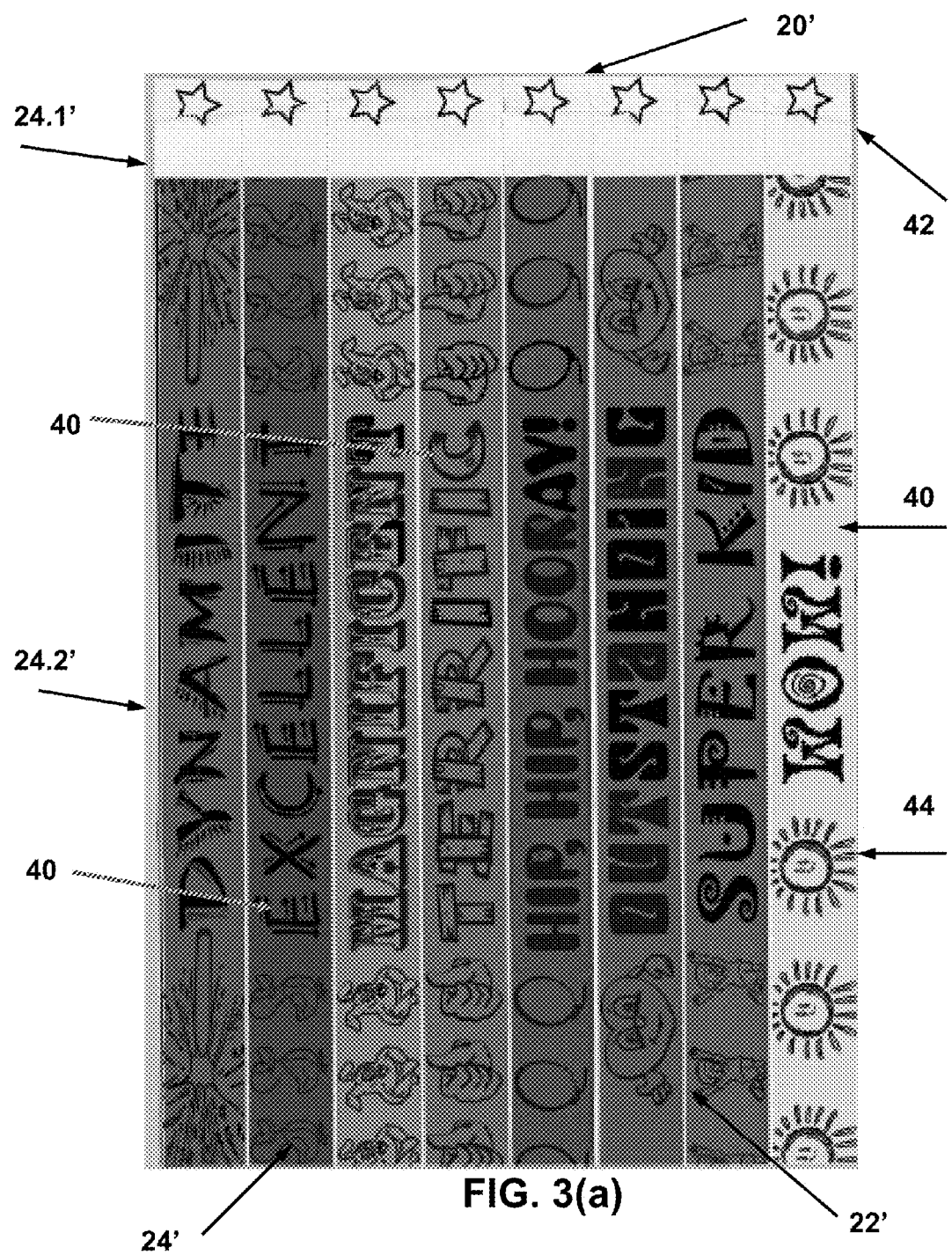
FIG. 3(*a*) is a front planar view of a sheet of strips according to another embodiment of the present invention.

FIG. 3(a) is a front planar view of a sheet 20' that includes printed material. In one embodiment of the present invention, each strip 24' includes various printed indicia 40. In some embodiments, each of the strips 24' includes a different printed message, and the messages are chosen to convey encouragement and reward to a young child.

In some embodiments, sheet 20' includes printed indicia 42 that extends across the top portion 24.1'. Additional printed material 44 extends across the body 24.2' of sheet 20'. In some embodiments, the top message 42 is generally repetitive, and indicates to the user (such as the child) the portion of the strip that will be coupled to form a ring, as will be shown later. In some embodiments, top message 42 is a geometric symbol.

Figure 3B:
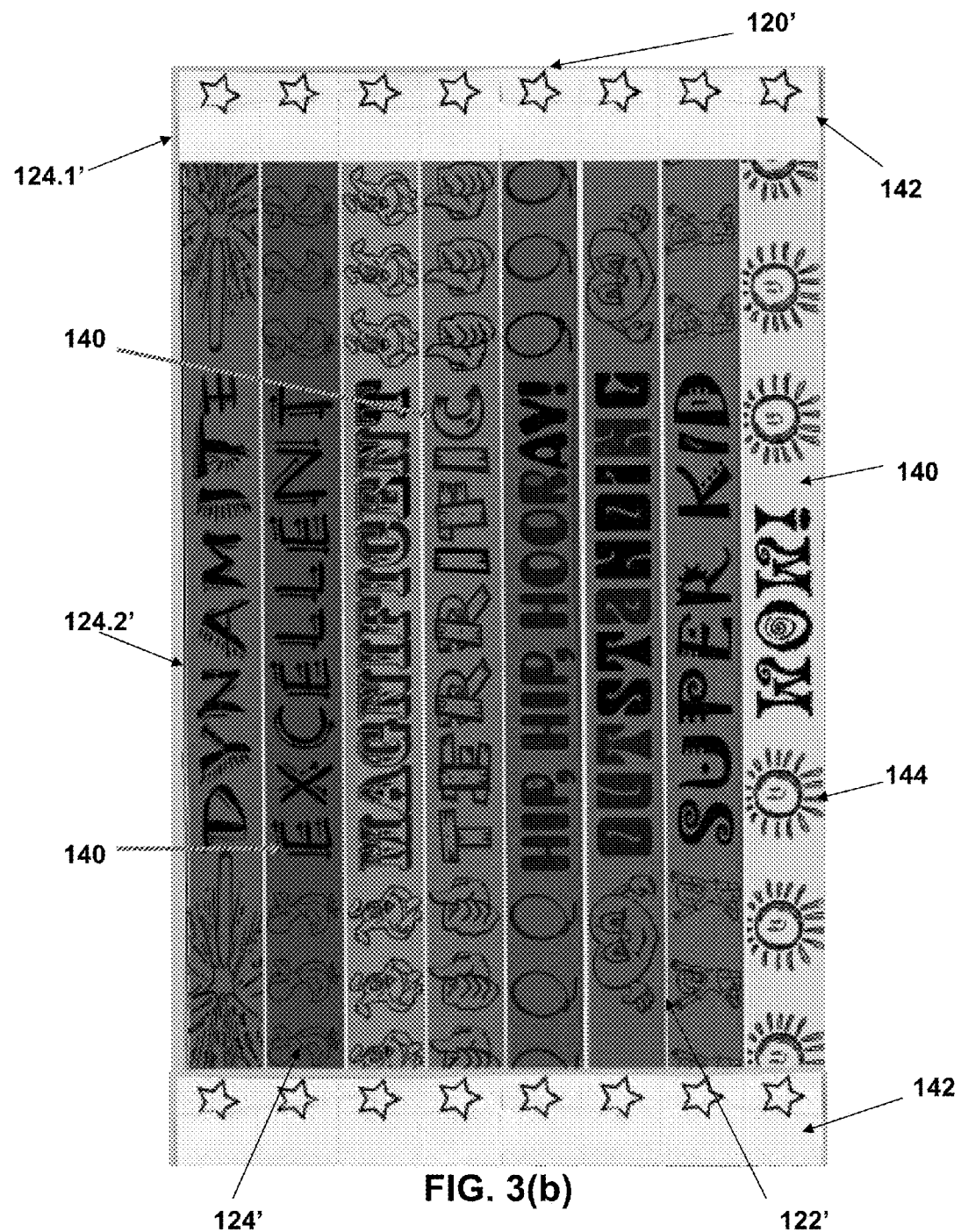

In yet other embodiments, and as shown in FIG. 3(b) the message 42 is also placed across the bottom of the strip. FIG. 3(b) shows a sheet 120' similar to 20'. One difference between the two embodiments is that sheet 120' includes a second message 142 across the opposite end of the sheet from the first message 142. In some embodiments, both the top and bottom ends include a layer of adhesive material 126 that extends on the opposite side of the messages 142. In such embodiments, the repetition of the same geometric shape at both the top and the bottom represents functionally to the child that the two separate ends are to be joined together. In yet other embodiments, the printed message 44 extending across most of each strip includes words and/or pictures of reward and encouragement. Preferably, printed matter 44 is brightly colored, each strip 24' being of a different color. Since some embodiments are intended for use by very young children, it is further preferable in those embodiments that each strip include a background color different than that background color of the adjacent strips, so as to readily convey to the very young child that each strip is separate from its adjacent strips.

Figure 4:
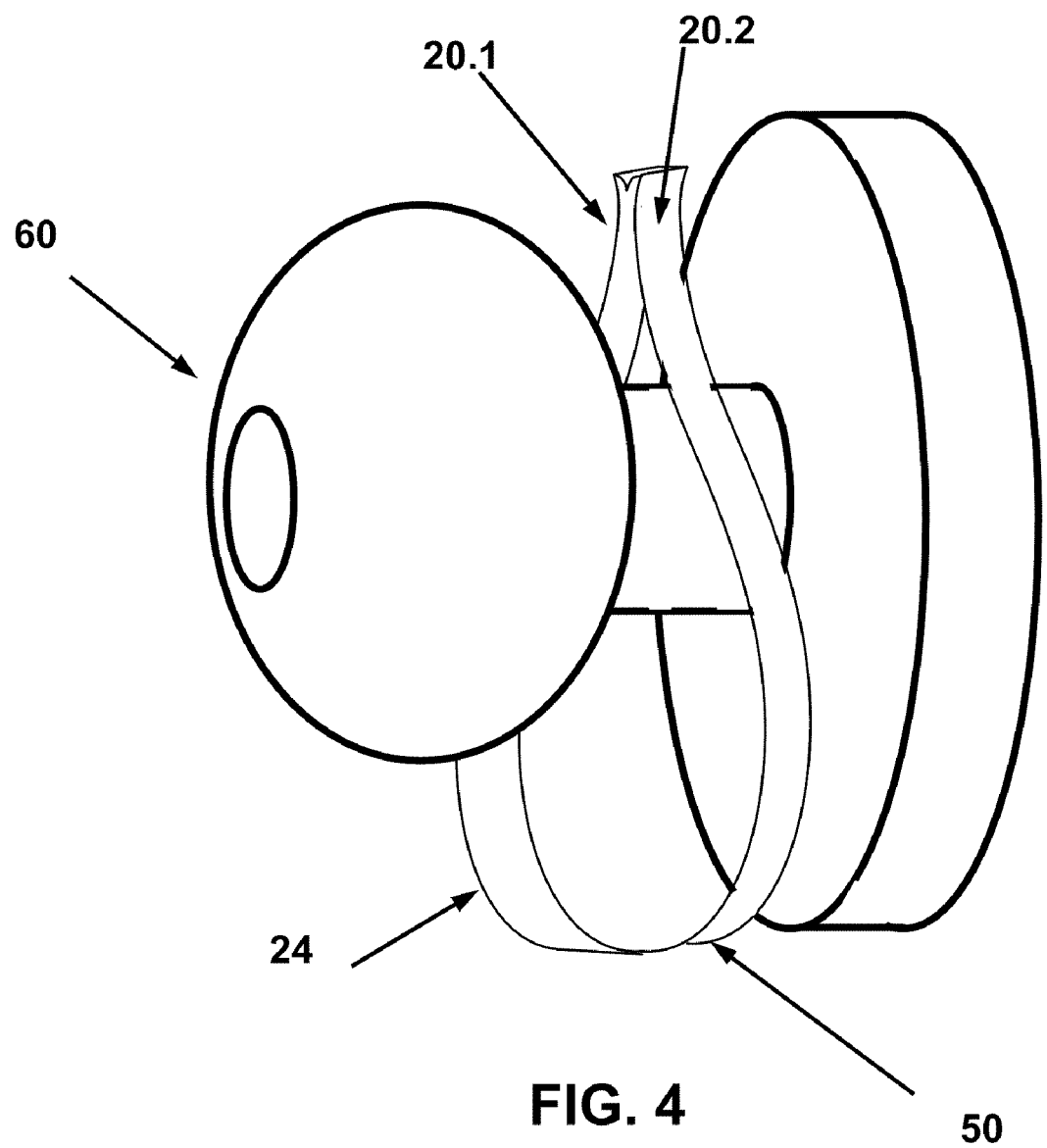
FIG. 4 is a side perspective graphical representation of a reward ring according to one embodiment of the present invention suspended from a doorknob.

FIG. 4 is a perspective graphical representation of a method for using the apparatus disclosed in FIGS. 1, 2, and 3. In a preferred embodiment, each individual strip 44 is peeled away from the backing sheet 20. In yet other embodiments the individual strips are attached to one another by perforations, and the strip is separated by breaking the perforations. An individual strip 44 has been separated from adjacent strips. The portion of liner 28 covering the strip's adhesive layer 26 has been removed. The separated strip 24 has been bent into a ring shape 50. The portion of liner 28 protecting the adhesive 26 of strip 28 has been removed, and the bottom rear portion 20.2 of strip 20 is placed into contact with the top rear portion 20.1, such that ring 50 has a closed configuration.

Figure 5:
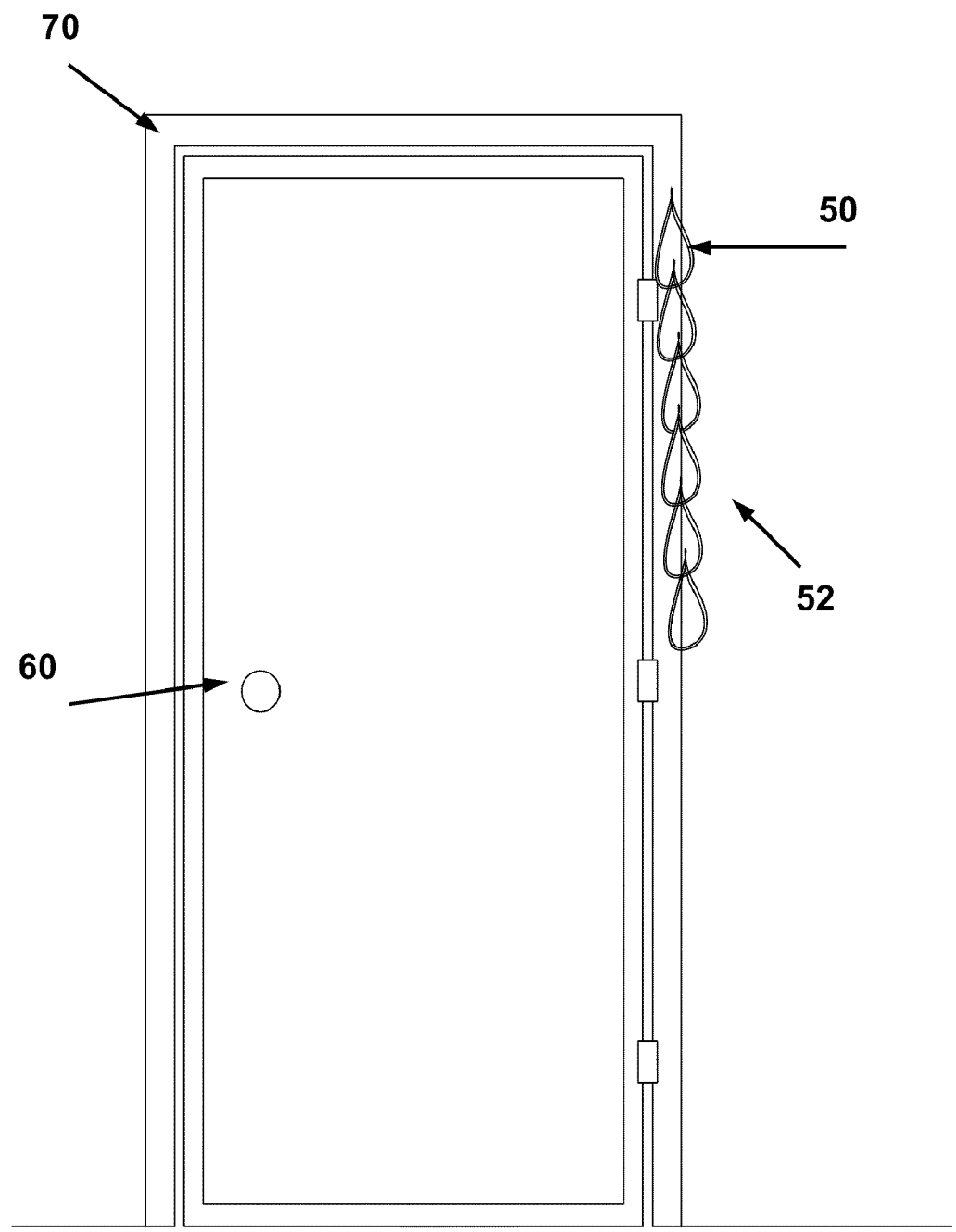
FIG. 5 is a frontal graphical representation of a reward chain according to one embodiment of the present invention suspended from a door frame.

FIG. 5 is a frontal graphical representation of a reward chain 52 according to one embodiment of the present invention suspended from a door frame 70. A plurality of rings 50, each representing an act worthy of reward to the child, are coupled together in a chain 52 and suspended from a door frame 70. Chain 52 can be hung from frame 70 in any convenient manner, including by a piece of tape, tack, or putty.

In one embodiment of the present invention, sheet 20 is part of a game 100 that is intended to encourage good behavior from young children. Each time a child accomplishes a task worthy of positive recognition, the child removes a strip 24 from sheet 20 and attaches it as a ring 50 to a doorframe or doorknob. Preferably, this child is assigned this doorframe or doorknob by the parents, such that in households with multiple children each child will have assigned to him or her a separate doorframe or doorknob.

Each time the child performs a task worthy of recognition, she or he is permitted to remove an additional strip 24 and form it into a ring 50 to be attached in a chain to the child's assigned doorframe or doorknob. Therefore, as the child continues to receive positive verbal recognition, she or he will also have a chain of positive reinforcement rings hanging from the assigned doorknob, acting as a showing to others in the household that the child is exhibiting good behavior. Thus, peer recognition from others in the household encourages the children of the household to continue acting in a positive manner such that the length of the chain grows. At some length predetermined by the parents, such as when the length of the chain is sufficient to touch the floor, the child is further rewarded with additional recognition, which can take the form of a gift or special privileges, as examples.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

The invention claimed is:

1. An apparatus for teaching a child, comprising:
a flexible sheet having opposite ends and opposite sides and including a plurality of readily separable strips each extending from one end to the other end;
each strip having printed thereon a message of positive reinforcement to the child, each message being printed on one side of said strip; and
a layer of adhesive across one end of said strips;
wherein each said strip is separable from said sheet and the separated strip can be formed into a ring by placing the end of the separated strip with adhesive in contact with the other end on the same side of the same strip.

2. The apparatus of claim 1 wherein each message is a single word.

3. The apparatus of claim 1 wherein each message is printed in a font different from any other font on said strips.

4. The apparatus of claim 1 wherein each said strip has a background color that is different than the background color of each adjacent said strip.

5. The apparatus of claim 1 wherein each said strip includes a symbol at the same end as said layer of adhesive.

6. The apparatus of claim 5 wherein said symbols of each said strip are a repetition of the same symbol.

7. The apparatus of claim 6 wherein said sheet includes a second plurality of symbols on the one side, said second plurality symbols being at the opposite end as said layer of adhesive.

8. The apparatus of claim 7 wherein each said plurality of symbols are repetition of the same symbol.

9. The apparatus of claim 6 wherein said sheet includes a second plurality of symbols on the one side, said second plurality symbols being at the opposite end as said layer of adhesive.

10. The apparatus of claim 1 wherein each of said plurality of strips are peelably attached to said sheet.

11. The apparatus of claim 1 wherein each of said plurality of strips are coupled to one another by perforations.

12. The apparatus of claim 1 wherein each of said plurality of strips are coupled to said sheet by perforations.

13. A method for teaching a child, comprising:
providing a sheet that includes a plurality of elongated strips, each strip having on one side a message of positive reinforcement to the child;
instructing the child to separate a strip from the sheet after the child performs a praiseworthy task;
adhering one end of the separated strip to the other end of the same strip;
forming a chain of adhered strips; and
giving the child a reward when the chain reaches a predetermined length.

14. The method of claim 13 which further comprises hanging the chain from a structure in the child's home.

15. The method of claim 14 wherein said giving is after the chain reaches the floor.

* * * * *